Jan. 2, 1962 G. S. TARBOX 3,015,300
FLOW INDICATOR UNIT
Filed April 29, 1960 2 Sheets-Sheet 1

INVENTOR
George S. Tarbox
BY Peck & Peck
ATTORNEYS

Jan. 2, 1962  G. S. TARBOX  3,015,300
FLOW INDICATOR UNIT
Filed April 29, 1960  2 Sheets-Sheet 2
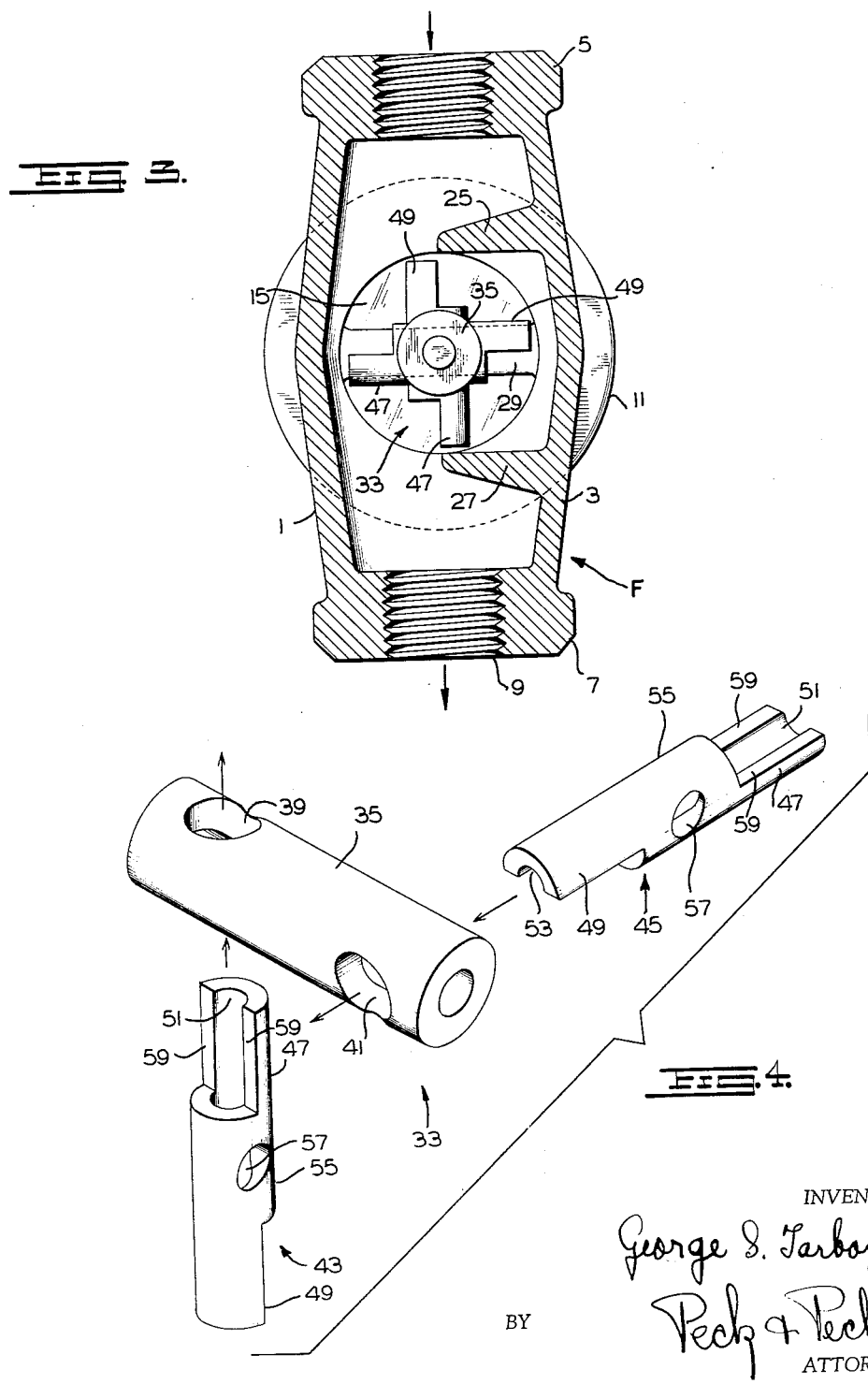
INVENTOR
George S. Tarbox
BY Peck & Peck
ATTORNEYS United States Patent Office 3,015,300
Patented Jan. 2, 1962

3,015,300
FLOW INDICATOR UNIT
George S. Tarbox, Yonkers, N.Y., assignor to Jacoby-Tarbox Corporation, Yonkers, N.Y., a corporation of New York
Filed Apr. 29, 1960, Ser. No. 25,631
3 Claims. (Cl. 116—117)

This invention relates broadly to the indicating art, and in its more specific aspects it relates to rotary type sight flow indicators for installation in pipe lines carrying solutions or gases for giving a visual indication of the flow of the solution or gas within the pipe line; and the nature and objects of the invention will be readily recognized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

It has been my experience that many rotary type sight flow indicators are not clearly visible, and in view of this prior defect I have devised a rotor which is of such shape and structure that its actions are clearly visible when operating in substantially any type of liquid or gas and when observed from a distance.

The devices of the prior art, of which I am aware, which are installed in pipe lines to give a visual indication of whether there is flow or not, do not start operating at low rates of flow of the liquid or gas.

I have devised an indicating unit which overcomes this fault which is inherent in prior devices, for it involves a rotor member which is positioned within the flow line of the solution or gas and is actuated or rotated by the liquid or gas even when its rate of flow is low. This highly advantageous result is accomplished by the construction, design and mounting of the rotor and by the material from which it is made which adds to its ability to function in the desired manner.

The low rate of flow characteristic of my rotor stems mainly from the unique form and construction of the impellers forming the actuating means for the rotor and which are caused to rotate by the impact thereon of the liquid or gas flowing in the pipe line. Not only does my design produce rotation at low flow rates, but it is also such as to increase its visibility.

One of the highly advantageous features of the rotor of this invention resides in the ease and economy of production thereof, for it is made of standard sizes of plastic or metal tubing and is fabricated merely by cutting the tubing and assembling the elements which make up the rotor. It will be appreciated that by making the rotor from elements formed of properly cut lengths of tubing which may be obtained on the open market, expensive and time-consuming molding operations are eliminated. Not only does the production of rotor elements from properly cut lengths of tubing provide economies of manufacture, but it also provides substantial economies of assembly of the various elements into the finished rotor.

The units or fittings in which sight flow indicators are mounted and operate are made in a variety of sizes and with prior type indicators it has been necessary to stock indicators for every size unit. However, the indicator of my invention, using commercially available tubing, eliminates the necessity of stocking for every size of unit, so that now it will only be necessary to stock certain sizes of tubing from which to fabricate the rotors.

It is desirable in sight flow indicators to reduce to as great an extent as possible the frictional resistance of the rotor to the flow of liquid or gas within the pipe line. The rotor which I have developed may be formed of a material having unusually low frictional properties.

The sight flow indicator of this invention is economical to produce and assemble and is efficient and long-lasting in use.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 3 is a view taken on line 3—3 of FIG. 1, with the rotor elements being shown in full lines.

FIG. 4 is an enlarged exploded view of the rotor components.

Figure 1:
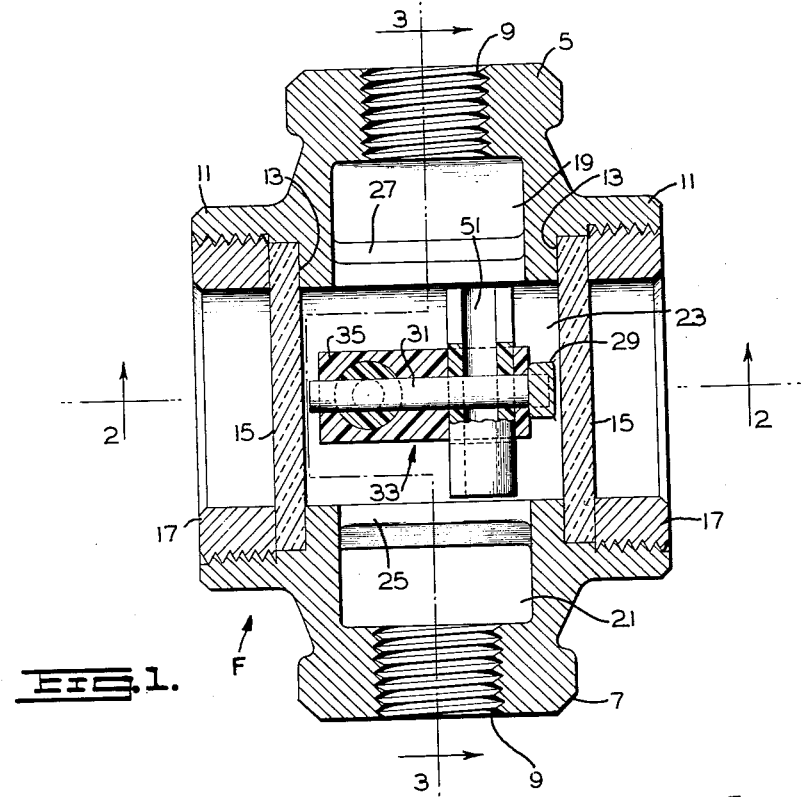
FIG. 1 is a vertical sectional view through a sight flow indicator unit, taken on a vertical plane slightly displaced to one side of the center of the flow path through the unit, with parts thereof partly broken away.
Figure 2:
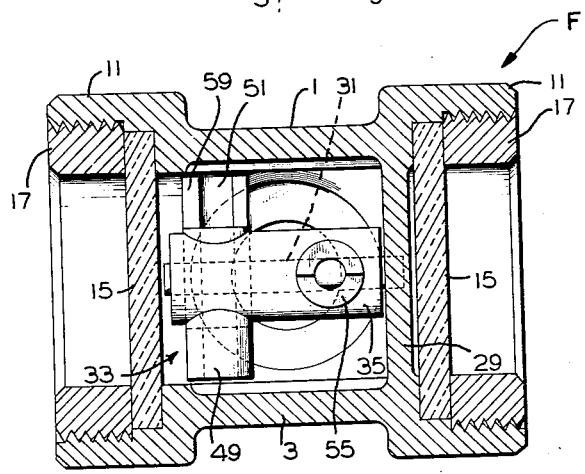
FIG. 2 is a view taken on line 2—2 of FIG. 1, with the rotor elements being shown in full lines.

In the accompanying drawings I have illustrated an indicator unit which is adapted to be installed in a pipe line for flow of liquid or gas therethrough, and in which an indicating rotor is operatively mounted for giving a visual indication of the flow condition of the liquid or gas being carried by the pipe line. Such unit comprises a hollow fitting designated generally by the reference character F, comprising opposite walls 1 and 3 which are extended at each end to provide an inlet nipple 5 and an outlet nipple 7, each nipple being internally threaded as at 9. Between the nipples the fitting is formed on each side with an internally threaded collar 11, inwardly of which an annular seat 13 is formed. Seated in each seat 13 is a transparent window or pane 15 which is removably maintained in seated position by means of a nut 17 threaded within the collar 11.

The bores of the nipples are in communication by means of passages 19 and 21 which open into an enlarged chamber 23 which is defined by walls 1 and 3 and transparent panes 15. The fitting is installed in a pipe line by removing a section thereof and threadedly connecting nipples 5 and 7 to adjacent ends of the pipe line. Thus, with the fitting installed, as described, the liquid or gas will flow into the fitting through nipple 5, through passage 19, chamber 23, passage 21, and out of the fitting and into the pipe line through nipple 7.

Projecting inwardly from the wall 3 are a pair of vertically spaced baffles 25 and 27. These baffles are spaced apart a distance approximately equal to the depth of chamber 23, the baffle 23 being positioned at the outlet end of passage 19 and the other baffle 25 being positioned adjacent the inlet end of passage 21 and each baffle extending inwardly a distance equal to approximately one-half the width of chamber 23. The purpose of these baffles will be explained in detail hereinafter.

I provide a bar 29 which is preferably cast with the fitting to extend between walls 1 and 3 adjacent one of the transparent panes 15 and through an end of chamber 23. The bar 29 is relatively narrow so as not to substantially obstruct the view through the adjacent transparent pane 15 and into the chamber 23.

I affix to the bar 29 at an intermediate point thereof a spindle 31 which projects therefrom and into and through chamber 23 and to a point adjacent to but spaced from the opposite transparent pane 15.

I have designated the rotor of my flow indicator unit in its entirety by the numeral 33. The rotor consists of a tubular axle 35 which is rotatively mounted on spindle 31 and is capable of limited axial movement between bar 29 and transparent pane 15. The axle 35 is provided with a pair of spaced transverse bores 39 and 41 therethrough, the axis of the bores being perpendicular to each other. The axle 35 is formed of a length of plastic or metal tubing of the proper diameter and, of course, is cut to the proper length for the particular installation. I provide a pair of impellers, one being designated generally by the numeral 43 and the other being designated generally by the numeral 45. Each impeller is composed of stock plastic or metal tubing which is cut to the proper or desired length to provide vanes 47 and 49. Each impeller forming length of tubing is cut inwardly a distance from each end along its axis and one-half of the tube is removed at one end to provide an active concave face 51 and the opposite half of the tube is removed at the other end to provide an active concave face 53 at that end which is directed in the opposite direction from face 51. Between and connecting the two vanes 47 and and 49 on each impeller is a tubular hub 55 having a bore 57 therethrough the axis of which is in the plane of the edges 59 of concave faces 51 and 53.

It is to be distinctly understood that for larger installations I may provide more than two impellers and such rotor will fall within the spirit and scope of my invention.

The rotor is assembled by inserting the impeller 43 in bore 39 of axle 35 with the bore 57 in alignment with the axial bore of the axle. The impeller 45 is inserted in bore 41 of the axle with its bore 57 in alignment with the axial bore of the axle. The assembled rotor is then mounted on spindle 31 and the spindle will, of course, extend through bores 57 in the impellers to maintain them against rotation and on the axle. The axial bore of the axle is of a diameter relative to the diameter of the spindle for free rotation of the rotor on the spindle. With the rotor mounted on the spindle, as described, the vanes 47 and 49 of each impeller will extend radially in opposite directions from the axle and the concave active faces will at all times be faced in opposite directions. It will be further apparent that the rotor will extend transversely across the path of flow of the liquid or gas flowing through chamber 23 and a viewer looking through either transparent pane 15 will be viewing the rotor axially thereof and will see the vanes extending radially from the axle.

With the rotor operatively mounted in chamber 23, as described, and the fitting installed in a flow line, the liquid or gas will flow into the fitting through nipple 5, through chamber 23 and out through nipple 7. The baffles 25 and 27 will shield the vanes extending radially on one side of the axle from the flow of liquid or gas so that such flow will only engage the vanes extending radially on one side of the axle to thereby cause the rotor to rotate and visually indicate that the liquid or gas is flowing in the pipe line. The rotor is so mounted that the concave faces of the vanes are directed toward the path of flow of the material (see FIG. 3) to provide active faces causing the rotor to rotate. It will be appreciated that the baffles prevent an equalizing of the impact forces on the vanes which might prevent rotation of the rotor.

While I may form my rotor of tubing of many plastics or metals, I have found that tubing formed of "Teflon"—polytetrafluorethylene (TFE—fluorocarbon resin) is highly satisfactory. This material exhibits extreme inertness to chemical attack, has low frictional properties, and is characterized by outstanding retention of properties over a wide temperature range. It is to be distinctly understood, however, that I do not intend to limit the rotor to one formed of "Teflon" tubing.

It will be recognized that due to the construction of my rotor an active concave face of a vane will always be in the path of the flowing liquid or gas and that the frictional resistance of the material of which the rotor is made is small, and for these and other reasons the rotor will rotate and give a visual indication at a low rate of flow of liquid or gas.

I claim:

1. A fluid flow indicator unit including a fitting in communication with a pipe line, said fitting having a flow passage therethrough in communication with said pipe line, a transparent pane defining a wall of said fitting, and a rotor operatively mounted in said passage, a spindle fixed in said fitting and rotatively mounting the rotor, said rotor being visible from the exterior of said fitting through said transparent pane, and said rotor comprising a tubular axle having a longitudinal bore therethrough and formed with a pair of axially spaced transverse openings therethrough, with the respective axis of each of said openings disposed at ninety degrees to each other and to said bore, a pair of impellers, one of said impellers extending through one of said openings and the longitudinal bore, and the other of said impellers extending through the other of said openings and the longitudinal bore, means coactive between each impeller and the spindle for preventing lateral displacement of an impeller relative to the axle, and each of said impellers extending radially in opposite directions beyond said tubular axle.

2. A fluid flow indicator unit in accordance with claim 1, wherein said spindle extends through the longitudinal bore of said axle, and each of said impellers is formed with an opening therethrough substantially intermediate the ends thereof, and said spindle extends through the opening in each impeller to prevent relative displacement thereof with respect to said axle.

3. A fluid flow indicator unit including a fitting in communication with a pipe line, said fitting having a flow passage therethrough in communication with said pipe line, a transparent pane defining a wall of said fitting, and a rotor operatively mounted in said passage, a spindle fixed in said fitting and rotatively mounting the rotor, said rotor being visible from the exterior of said fitting through said transparent pane, and said rotor comprising a tubular axle having a longitudinal bore therethrough and formed with axially spaced transverse openings therethrough, with the respective axis of each of said openings angularly disposed to each other and to said bore, an impeller for each of said openings, each impeller extending through one of said openings and the longitudinal bore of said axle, means coactive between each impeller and the spindle to prevent lateral displacement of an impeller relative to the axle, and each impeller extending radially in opposite directions beyond said tubular axle.

References Cited in the file of this patent

UNITED STATES PATENTS

| | | |
|---|---|---|
| 136,799 | White | Mar. 11, 1873 |
| 271,233 | Fredrick | Jan. 30, 1883 |
| 1,385,717 | Sams | July 26, 1921 |